July 5, 1932. E. D. COLEMAN 1,865,615

METHOD OF AND APPARATUS FOR THE EXTRACTION OF VEGETABLE OILS

Filed May 19, 1930

Inventor:
Edwin D. Coleman,
By Chindall Parker Karlson
Attys.

Patented July 5, 1932

1,865,615

UNITED STATES PATENT OFFICE

EDWIN D. COLEMAN, OF BARRON, WISCONSIN

METHOD OF AND APPARATUS FOR THE EXTRACTION OF VEGETABLE OILS

Application filed May 19, 1930. Serial No. 453,535.

This invention relates to the recovery of vegetable oils from oleaginous materials such as linseed, cottonseed, soy beans and the like, and has more particular reference to the extraction of oil by the use of a volatile solvent for the oil.

As heretofore practiced, the solvent extraction of vegetable oils has involved the handling of the oleaginous material in batches either in the leaching step or in the final washing and separation of the spent material, that is, the material which has been subjected to the extracting solvent. For this reason it has been impractical to carry on the extraction with material of the degree of fineness most favorable to complete recovery of the oil, and excessive quantities of solvent have been required. The unnecessary handling of solvent and material containing solvent has contributed to the low efficiency and high cost of prior processes.

The primary object of the present invention is to overcome these deficiencies by providing a new and improved method which combines the leaching and washing steps to form a continuous process capable of being carried out with a minimum amount of equipment and handling of materials, which permits optimum recovery of oil by enabling the leaching to be carried out with the material in the most favorable state of fineness, which utilizes the solvent efficiently thereby reducing the quantity used for a given quantity of oil recovered, and which reduces labor costs by rendering the control of solvent and material concentration simple and substantially automatic.

In carrying out the foregoing object, a mixture of heated solvent and finely divided seed is advanced at a slow uniform rate through a closed receptacle, the mixture being agitated continuously to maintain the seed in suspension and prepare the same for delivery to a second closed receptacle through which the seed is advanced continuously and subjected at all times to centrifugal action to filter off the solvent and subsequently wash the seed with solvents of progressively decreasing oil concentrations.

The invention also resides in the novel character of the apparatus by which the spent material is subjected continuously to a powerful centrifugal action for separating the highly concentrated solvent from the spent material and washing the latter in a succession of stages.

Figure 1:
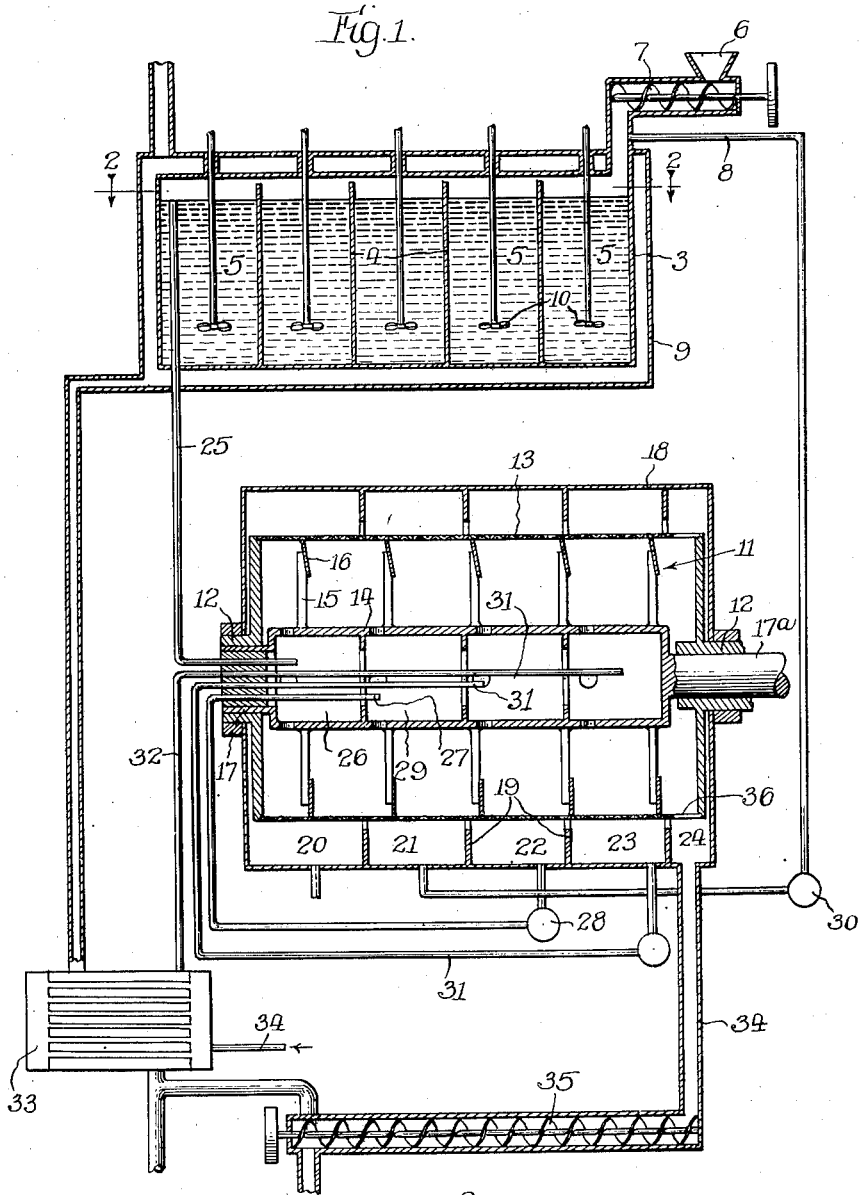

Other objects and advantages of the invention will become apparent from the following detailed description taken in connection with the accompanying drawing, in which Figure 1 is a schematic view of the apparatus used for carrying out the present invention.

Figure 2:
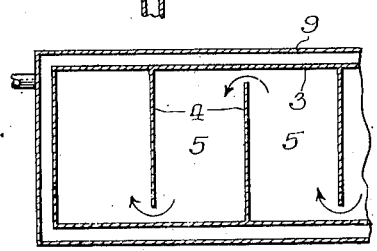

Fig. 2 is a fragmentary sectional view of the leaching tank taken along the line 2—2 of Fig. 1.

While I have shown in the drawing an exemplary apparatus by which the present invention may be carried out, it is to be understood that I do not intend to be limited thereby but aim to cover all modifications of the invention and alternative constructions that fall within the spirit and scope of the invention as expressed in the appended claims.

Referring now to the drawing, the extraction or leaching of the oil from the oleaginous material or seed may be effected in an elongated closed tank 3 having staggered partitions 4 projecting inwardly from its opposite side walls, as shown in Fig. 2, and dividing the tank into a series of compartments 5 through which the solvent and seed mixture must flow progressively. With this arrangement the time during which the seed is subjected to solvent action may be determined accurately.

The finely divided seed is stored in a hopper 6 and fed by a screw conveyor 7 into one end compartment of the tank where it is mixed with solvent supplied through a conduit 8 from the washing operation later to be described, the solvent thus introduced carrying some dissolved oil. By regulating the operation of the screw 7 and the flow of the solvent, the proportion of solvent and seed to effect most efficient extraction may readily be maintained.

In order that the solvent may be utilized to best advantage, the extraction is carried on at a temperature slightly below the boiling point of the solvent and the seed is maintained in a state of suspension during its passage through the leaching tank. Part of the heat for maintaining the first condition is carried by the incoming solvent which is heated prior to the washing operation. Additional heat is supplied by steam or solvent vapors flowing through a casing 9 which surrounds the tank 3 and forms a jacket for the latter.

To maintain the seed in suspension and thereby prepare the mixture of solvent and seed for most efficient use in the centrifugal washer to be presently described, the liquid in each compartment 5 is constantly agitated by means such as power operated propellers 10. In this way the seed particles are maintained in intimate contact with the solvent and thereby subjected to the same action for the same interval of time.

The next steps in the present process involve separation of the oleaginous material from the solvent used in the leaching tank and then washing the spent seed in successive stages with fresher solvent in order to replace the more concentrated solvent which saturates the seed after the initial separation of the seed and solvent. In the present instance, all of these steps are performed by subjecting the spent material to centrifugal action while it is being advanced continuously along a single filtering surface within a second closed receptacle. The filtering surface is defined by a drum 11 rotatable at high speed about a horizontal axis and having hollow end trunnions 12 journaled in stationary bearings and rotated at high speed by suitable power means (not shown). The cylindrical wall 13 of the drum is defined by a filtering medium such as screen or coarse fabric through which the solvent may be thrown readily by centrifugal force.

Means is provided for conveying the spent material at a substantially uniform rate along the inner drum surface during the several separating and washing stages. This means comprises a hollow shell 14 rotatably mounted within the drum and having arms 15 carrying plows 16 which bear against the inner drum surface and are inclined in a direction such that relative motion between the drum and the shell causes the spent seed to be advanced toward the discharge end of the drum. This rotary conveyor has a hollow end trunnion 17 journaled in one trunion 12 and a second trunnion 17ª rotated in the same direction as the drum but at a slightly different speed.

The drum is completely enclosed by a cylindrical stationary casing 18 which is closed at both ends and formed with a plurality of radially projecting annular fins 19 which divide the casing into axially spaced compartments 20, 21, 22 and 23 of substantially equal length for receiving the filtered solvent and a narrower compartment 24 for receiving the centrifuged material discharged from the open end of the drum.

Because the seed is maintained in a state of suspension in the solvent during the leaching step, the mixture as it exists in the last compartment 5 is conditioned for immediate delivery to the centrifugal separator above described. The mixture is conducted through a pipe 25 which leads into the shell 14 through the end trunnion 17 thereof and discharges at a point adjacent the closed end of the drum. To minimize the handling of solvent by pumps the flow through the pipe 25 is preferably induced by gravity, the inlet end of the pipe being for this purpose made as a long vertical section.

The solvent and spent seed mixture discharged from the pipe 25, falls into an end compartment 26 in the shell and flows through the perforated shell wall into the drum near the closed end of the latter. The centrifugal force under which the mixture is then placed causes the solvent to pass through the filtering medium into the compartment 20 from which it is conducted to suitable apparatus (not shown) for distilling off the solvent. In this way, the bulk of the solvent richest in oil is separated from the spent seed in the end portion of the drum.

As the seed is advanced by the conveyor plows 16 to a point opposite the compartment 21, it is washed with solvent containing some dissolved oil, this being supplied through a pipe 27 extending into the shell 14 through the latter's end trunnion and receiving solvent from a pump 28 which draws the solvent from the compartment 22. This solvent is discharged into a compartment 29 of the shell and falls into the drum through perforations in the shell wall and becomes mixed with the mass of spent seed as the latter passes the discharge end of the compartment 20. The solvent filtered off at this stage by the centrifugal action collects in the compartment 21 from which it is drawn by a pump 30 and delivered to the pipe 8 by which it is conveyed to the inlet end of the leaching tank.

While the seed is passing that portion of the drum opposite the compartment 22, it is washed with fresher solvent derived from the subsequent washing step and forced into the shell through a pipe 31. This solvent flows through the shell, washes the spent seed, and is filtered off into the compartment 22 from which it is drawn by the pump 28 as above described for use in the first washing operation.

The number of stages of washing with solvent of progressively decreasing concentrations may be multiplied as desired to effect complete replacement of the more highly concentrated solvent which saturates the spent seed upon the initial separation following the leaching step. In the last stage the seed is washed with fresh or oil free solvent supplied through a pipe 32 from a preheater 33 to which the solvent is delivered through a pipe 34.

From the foregoing, it will be apparent that as the spent seed is advanced continuously along the inner surface of the drum, it is constantly subjected to centrifugal action which in successive sections of the drum effects first a separation of the highly concentrated solvent from the seed, washing of the seed with solvents of progressively decreasing oil concentrations, and finally a washing with fresh solvent. Further leaching of the seed by solvent continues these washing operations, thereby minimizing the time during which the seed must remain in the leaching tank. The filtering operation in all of the stages takes place efficiently by virtue of the fact that the viscosity of the solvent is decreased to a minimum by maintaining its temperature near the boiling point. The heat supplied by the preheater 33 and the steam jacket 9 is utilized advantageously by virtue of the manner in which the solvent is handled, particularly because the filtered solvent from the first washing is used in the leaching tank.

With the particular type of centrifugal separator employed, it will be apparent that all of the separating and washing steps may be carried on in a single machine which is less bulky than apparatus heretofore employed and well adapted to handle spent seed of a fineness most advantageously used to effect efficient extraction by the leaching process herein employed. Such a washer has the further advantage that it will operate efficiently and with little attention even though a definite proportion of solvent and spent seed is not maintained. Heat and solvent losses in the present process are effectually minimized which further contributes to the economy of the process.

After separation of the solvent from the spent seed in the last stage of washing, the latter is discharged from the drum through openings 36 into the compartment 24. In view of the inherent inability of the centrifugal separator to effect complete solvent separation, this seed is conducted through a pipe 34 to a steam jacket conveyor 35 where part of the solvent is vaporized. Final treatment of the material for solvent removal before caking may be performed in any suitable apparatus (not shown).

I claim as my invention:

1. The method of extracting oil from oleaginous material by means of a volatile solvent which consists in advancing a mixture of the solvent and material in a continuous stream while the mixture is subjected to heat, agitating the mixture to maintain the material suspended in the solvent, directing the mixture onto a rotating cylindrical filtering surface through which the solvent from said mixture is thrown by centrifugal force, advancing the material continuously along said surface, supplying solvents of progressively decreasing oil concentrations to said material at successive points along said surface, distilling the solvent first filtered off from said material, collecting the solvent next filtered from said material, and mixing the same with untreated material to be added to said stream.

2. In the process of extracting oil from oleaginous material, the method of separating solvent of high oil concentration from the leached material and thereafter washing the material which consists in subjecting a mixture of the solvent and material to centrifugal force to filter off the solvent while advancing the material continuously through a separating stage and then through a plurality of stages of washing, each comprising a plurality of revolutions of the mixture, collecting the first mentioned solvent after filtration thereof, supplying separate streams of fresher solvent to the material in each of the successive washing stages, and utilizing the solvent filtered off at each of said washing stages as a source of solvent supply for the preceding washing stage.

3. In the process of extracting oil from oleaginous material, the method of separating solvent of high oil concentration from the leached material and thereafter washing the material which consists in subjecting a mixture of the solvent and material to centrifugal force to filter off the solvent while advancing the material continuously through a separating stage and then through a plurality of stages of washing, each including a plurality of revolutions of the mixture, collecting the first mentioned solvent after filtration thereof, and supplying separate streams of fresher solvent to the material in each of the successive washing stages.

4. In the process of extracting oil from oleaginous material by means of a volatile solvent, the steps which consist in subjecting the spent material to centrifugal action during a plurality of revolutions of a filtering surface while advancing the material continuously along said surface, supplying solvents of decreasing oil concentrations to the material at spaced points along said surface to effect washing of the material in successive stages, and collecting the solvent filtered off at each of said stages for use in the preceding stage.

5. In the process of extracting oil from oleaginous material by means of a volatile solvent, the steps which consist in subjecting the spent material to centrifugal action during a plurality of revolutions of a filtering surface while advancing the material continuously along said surface, and supplying separate streams of washing solvent at a plurality of spaced points along said surface.

6. In an apparatus for the solvent extraction of oil from oleaginous material, the combination of a drum having a cylindrical filtering surface rotatable about a horizontal axis, means for delivering a mixture of solvent and material to said drum at one end of said surface, means operable as an incident to the rotation of said surface to advance the material continuously along the surface from the inlet end to the discharge end of the drum, a casing surrounding said drum and divided into a plurality of compartments for receiving the solvent filtering through the successive longitudinally spaced sections of said surface, and means for supplying the solvent collecting in certain of said compartments to the section of said surface through which the solvent passes into the preceding adjacent compartment.

7. In an apparatus for the solvent extraction of oil from oleaginous material, the combination of a drum having a cylindrical filtering surface rotatable about a horizontal axis, a plurality of pipes extending into one end of said drum along the axis thereof and terminating at points spaced longitudinally along said axis, a conveyor within said drum for advancing the material along said surface from the inlet to the discharge end of said drum, means for delivering a mixture of solvent and material to said drum through the pipe which terminates adjacent the inlet end of the drum, means for supplying fresh solvent to the drum through the pipe which terminates adjacent the outlet end of the drum, and means for collecting the solvent filtering through said drum adjacent the outlet end thereof and delivering such solvent to the drum through another of said pipes.

In testimony whereof, I have hereunto affixed my signature.

EDWIN D. COLEMAN.